March 19, 1968 R. A. HAWLEY 3,373,777
FOOD MOLD LOADER

Filed Nov. 12, 1965 3 Sheets-Sheet 3

United States Patent Office 3,373,777
Patented Mar. 19, 1968

3,373,777
FOOD MOLD LOADER
Richard A. Hawley, Oakland, Calif., assignor to Meat Packers Equipment Co., Oakland, Calif., a corporation of California
Filed Nov. 12, 1965, Ser. No. 507,509
8 Claims. (Cl. 141—263)

ABSTRACT OF THE DISCLOSURE

An apparatus—for filling a meat loaf mold—which includes a stuffing horn, a mold-supporting carriage, and means mounting the carriage for movement toward and away from the stuffing horn; there being a power unit operative to so move the carriage.

---

This invention relates to a device for filling or loading a conventional meat loaf mold, and particularly represents improvements over the devices for the same purpose shown in U.S. Patent No. 2,726,024 and in copending application Ser. No. 465,326, filed June 21, 1965.

In the previous devices, the mold-supporting carriage has been manually moved to place the mold on the fixed stuffing horn, while the pressure of the meat being extruded from the horn moved the carriage in the opposite direction.

The principal object of the present invention is to provide a food mold loader having the same basic features as in the previous services, but one in which the mold-supporting carriage is moved in both directions by power means.

An additional object of the invention is to provide a food mold loader, as above, in which the functioning of the power means, in an otherwise substantially automatic manner, is controlled by the use of a single hand-operated valve.

Another object of the invention is to provide for the control of the power means in such a manner that while the movement of the carriage in a direction to place the mold on the horn may be at a fast rate, the movement of the carriage in the opposite direction—as when the mold unit is being filled—will be substantially slower and at a rate coordinated to the pressure exerted by the extruding meat so that the mold will be packed to the required density.

A further object is to provide an improved mounting and control for the filled mold receiving and supporting platform whereby transfer of the mold from the carriage to the platform is accomplished with less effort than has previously been the case.

A further object of the invention is to provide a food mold loader which is designed for ease and economy of manufacture, and convenience of use.

A still further object of the invention is to provide a practical, reliable, and durable food mold loader and one which is exceedingly effective for the purpose for which it is designed.

These objects are accomplished by means of such structure and relative arrangement of parts as will fully appear by a perusal of the following specification and claims.

In the drawings:

FIG. 6 is a diagrammatic plan of the table of the loader; the view showing the placement of the different valve-operating buttons thereon.

Figure 1:
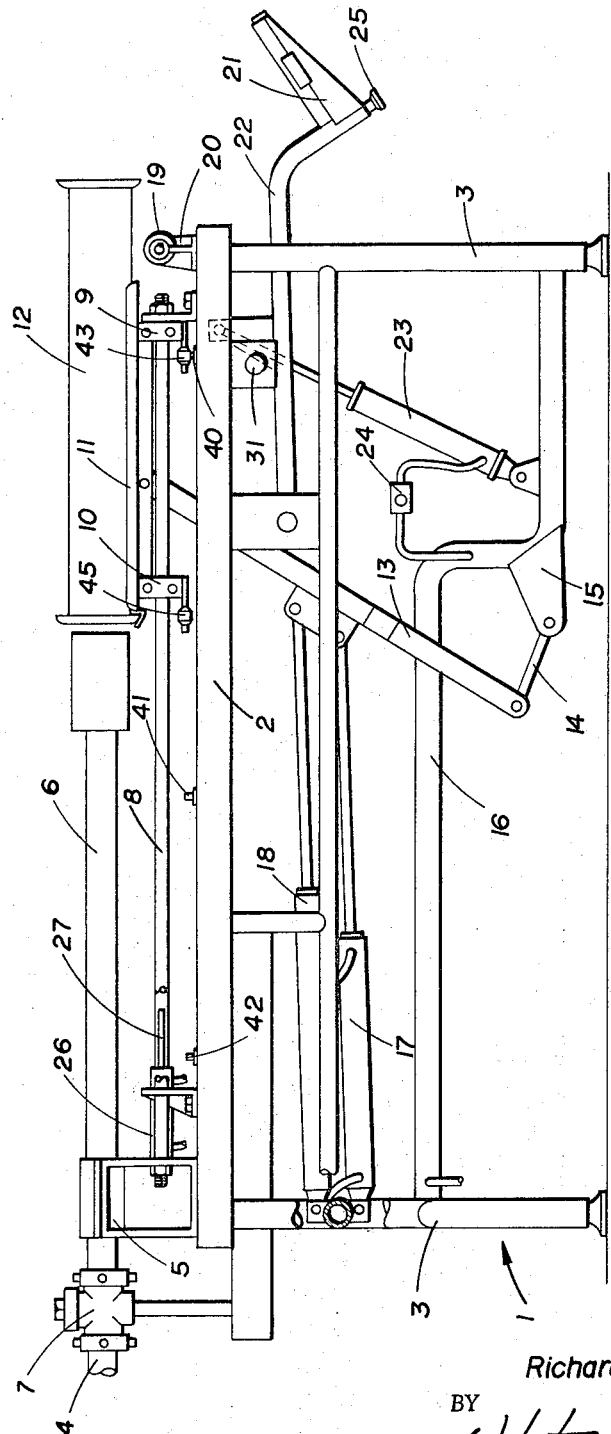
FIG. 1 is a side elevation of the improved food mold loader; the view showing the mold-supporting carriage and the mold unit in a fully retracted position.

Referring now more particularly to the drawings and to the characters of reference marked thereon, the food mold loader of the present invention includes an upstanding longitudinal frame, indicated generally at 1, surmounted by a horizontal table 2; the frame including supporting legs 3. Disposed a short distance back from the frame is a conventional pressure-type meat loaf material stuffer (not shown) from which a tubular outlet 4 extends toward the frame 1; the outlet 4 being horizontal and at a level a relatively short distance above the plane of the table 2.

A stuffing horn unit 6 is mounted in and projects forwardly from an upstanding support 5 on the table 2 at its rear end; such horn unit being alined with the outlet 4 and connected thereto by a vertical-axis valve 7. The horn unit 6 is thus disposed in a rigid position some distance above the table 2 and parallel thereto.

A pair of transversely spaced, longitudinal rods 8 are supported from and spaced above the table 2 in a suitable manner; these rods carrying the front and rear roller brackets 9 and 10, respectively, of a carriage 11 on which a conventional meat loaf mold unit 12 is removably supported in a longitudinal position. The mold unit 12—when so supported—projects some distance beyond the forward end of the carriage.

Figure 2:
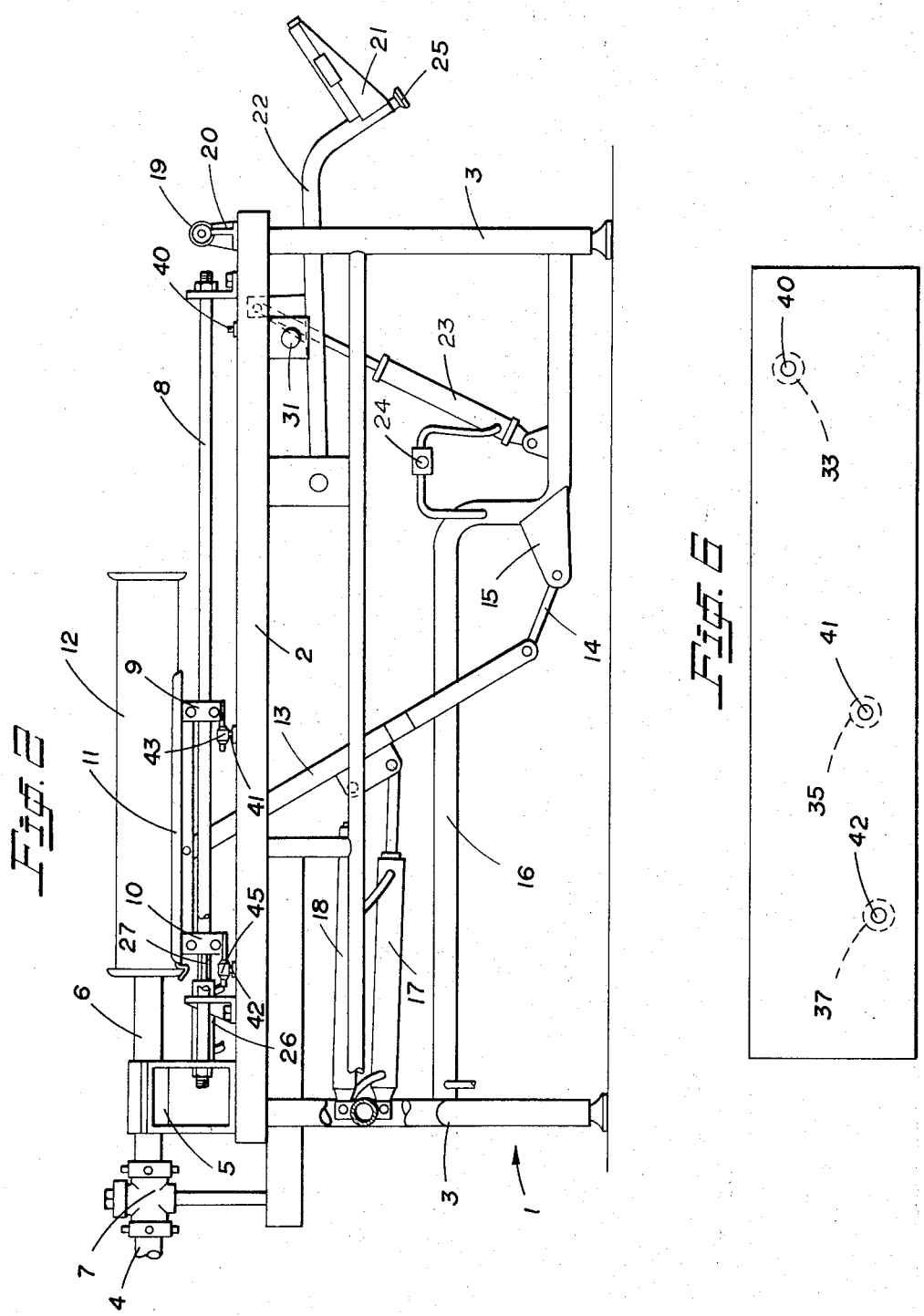
FIG. 2 is a similar view but shows the carriage and mold unit in a fully advanced position.

The length and disposition of the rods 8 relative to the horn unit 6 is sufficient to enable a carriage-supported mold unit 12 to be moved from a retracted position clear of the horn unit to an advanced position completely engaging over said horn unit as shown in FIGS. 1 and 2, respectively.

A depending arm 13 is pivoted at its upper end on the underside of the carriage 11, and at its lower end—well below the table 2—said arm is pivoted on one end of a short link 14; the other end of such link being pivoted on a bracket 15 fixed on a member 16 of the frame 1.

A substantially horizontal, pneumatic power cylinder 17 of double-acting type is connected at one end to the arm 13 intermediate the ends thereof, and at its other end said power cylinder is connected to the frame 1.

A hydraulic, motion-retarding cylinder 18 (parallel to the power cylinder 17 and close thereto) is also connected at one end to the arm 13, and at the other end to the frame 1; such cylinder being adjustable to alter its resistance to motion.

A transverse-axis fulcrum roller 19 is journaled between upstanding brackets 20 at the forward end of the table 2 whereby a filled mold unit 12 may be tilted over said roller 19 from a horizontal position on the carriage as retracted, to a vertical position and deposited on a platform 21 ahead of the frame 1.

The platform 21 is mounted on the forward or outer end of a longitudinal supporting arm 22 which—at its rear end—is pivoted on the frame 1 rearwardly of the forward end thereof and a relatively short distance below the table 2. An air-spring cylinder 23 is pivotally connected at its upper end to the arm 22 intermediate the ends of the latter, and at its other and lower end said cylinder 23 is similarly connected to the frame member 16.

A short conduit with a pressure regulator 24 is connected between the cylinder 23 at its lower end and the member 16; the latter being a hollow, air pressure reservoir. The pressure in cylinder 23 is regulated in accordance with the weight of the filled mold unit to be received on the platform 21.

The arm 22 and platform 21 are arranged so that when the cylinder 23 is extended, the major portion of the arm 22 is substantially horizontal, while the platform 21 is disposed at an angle to a horizontal plane and faces in the direction of the roller 19 some distance below the same, as shown in FIG. 1.

Figure 3:
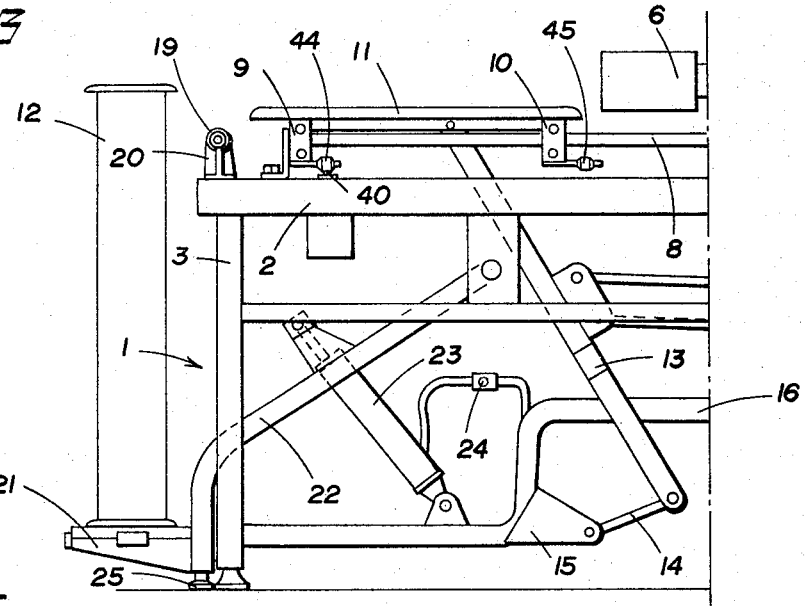
FIG. 3 is a fragmentary side elevation of the loader, with the carriage in a fully retracted position and the mold unit discharged from the carriage; this view being taken from the side of the machine opposite from that shown in FIG. 1.

When a filled mold unit 12 is tilted forwardly (over roller 19) until said mold unit initially rests on the platform 21 at an angle to a vertical plane, the weight of such mold unit causes the platform to lower; this motion being gradual due to the retarding effect of cylinder 23. When the mold unit becomes vertical, the platform is horizontal and close to the floor, as shown in FIG. 3. Feet 25 on the platform supporting portion of the arm 22 then rest on the floor. After the filled mold unit is removed from the lowered platform, the air pressure in the cylinder 23 acts to raise the platform to its initial position.

A horizontal safety cylinder 26 (of single-acting penumatic type) is mounted on the frame 1 at its rear end in a longitudinally extending direction above the table 2. A piston rod 27 projects from the forward end of the cylinder 26 in position to engage a rearmost roller bracket 10 upon the carriage (with a mold unit thereon) being moved by the action of the power cylinder 17 to an advanced position and at which the forward end of the horn unit 6 is close to the bottom of the mold unit.

Figure 5:
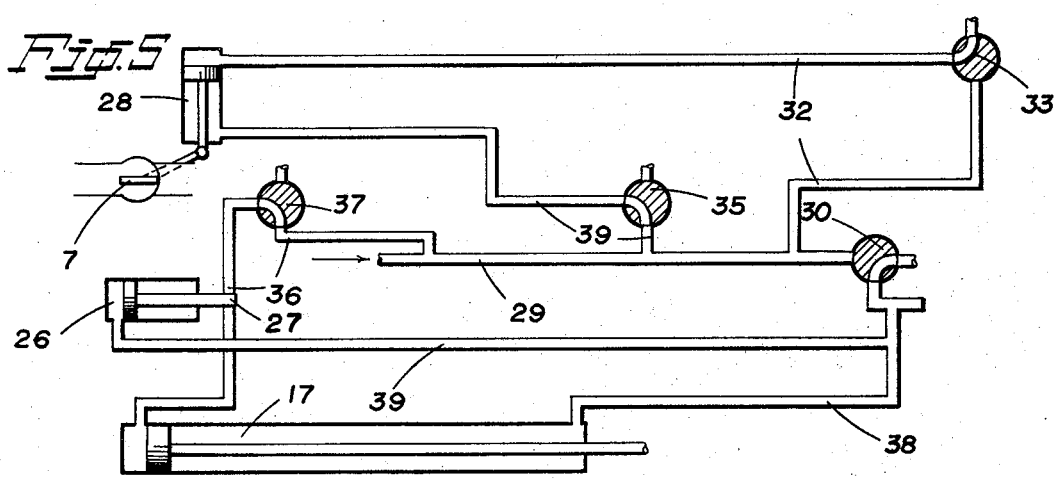
FIG. 5 is a similar view, but shows the positions of said parts and valves when the carriage is fully advanced.

A conduit arrangement, as shown in FIGS. 5 and 6, is provided for controlling the operation of the power cylinder 17, the safety cylinder 26, and a power cylinder 28 (of double-acting pneumatic type) which controls the movement of the initially closed stuffer valve 7.

This conduit arrangement comprises an air pressure supply pipe 29 having a hand-operated valve 30 therein; the valve being actuated by a push-pull button 31 projecting from one side of the frame 1 adjacent its forward end.

Rearwardly of the valve 30, an air line 32 leads from pipe 29 to one end of the cylinder 28; there being a valve 33 interposed in line 32 near the forward end of the table 2. The valve 33 is arranged to establish communication between the air supply pipe 29 and the cylinder 28, or to exhaust air from said cylinder to atmosphere.

Figure 4:
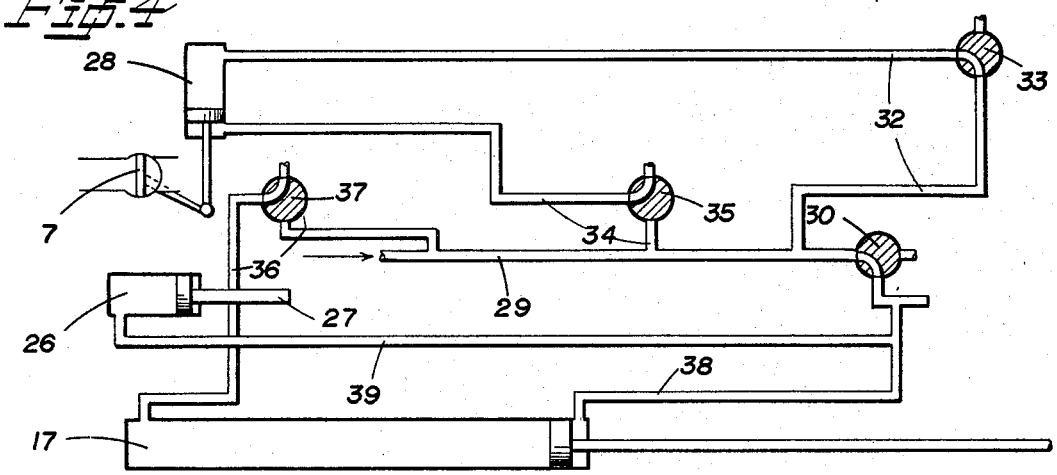
FIG. 4 is a diagram of the main air-operated parts of the loader, and the conduit arrangement and valves therefor; the view showing the positions occupied by said parts and valves when the carriage is fully retracted.

The cylinder 28 is mechanically connected to the valve 7 so that—when air pressure is being fed to said cylinder through the line 32—the valve 7 will be held closed, as shown in FIG. 4.

A second air line 34 leads from the supply pipe 29 rearwardly of the valve 30 to the other end of the cylinder 28. The line 34 has a valve 35 therein arranged to open said line 34 to the cylinder 28, or to exhaust the air from said cylinder.

A third air line 36 leads from the supply pipe 29 (rearwardly of the valves 30 and 35) to the rear end of the power cylinder 17; there being a valve 37 interposed in said line 36 and arranged to feed air pressure to the cylinder 17 or exhaust the air therefrom.

A fourth air line 38 leads to the forward end of the cylinder 17 from the supply pipe 29 at a point forwardly of the valve 30, while a fifth air line 39 connects the rear end of the safety cylinder 26 with the air line 38.

The valves 33, 35, and 37 are changed from one position to another by means of spring-returned buttons 40, 41, and 42, respectively. These buttons project upwardly from the table 2 in positions—laterally and longitudinally of the table—to be depressed, respectively, by trips 43 and 44 mounted on and projecting rearwardly from the laterally spaced front roller brackets 9 and a trip 45 mounted on and projecting rearwardly from one of the rear roller brackets 10. Referring to the diagram of FIG. 6 (which shows the relative lateral positions of the valve-operating buttons), the foremost button 40 is positioned to be engaged only by the trip 43; the intermediate button 41 is positioned to be engaged only by the trip 44; and the rearmost button 42 is positioned to be engaged only by the trip 45.

Lengthwise of the table and relative to the carriage-supported trips, the button 40 is positioned to be engaged by the trip 43 when the carriage is fully retracted and the button 41 is positioned to be engaged by the trip 44 just before the carriage is fully advanced, while the button 42 is engaged by the trip 45 at practically the same time.

*Operation*

When the carriage is fully retracted, the button 40 is depressed and the valve 33 is opened to admit air pressure from the supply pipe to the cylinder 28 through line 32 so as to cause the stuffer valve 7 to be moved to a closed position; said valve 33 being of a type which is self-closing as soon as the button is released and the line 32 from the cylinder 28 is opened to atmosphere. The hand valve 30 is then opened so as to admit air pressure into the cylinder 17 at its forward end; such cylinder then acting to advance the carriage 11—with the empty mold unit thereon—until the front end of the horn unit 6 is adjacent the bottom of the mold unit. Further advancing movement of the carriage is stopped by engagement of the projecting rod 27 of the now energized safety cylinder 26 with one of the roller brackets 10. At this point, the operator closes the valve 30 so that the air pressure to the cylinder 17 is shut off, and the air exhausts to atmosphere both from the cylinder 17 and from the safety cylinder 26.

This, of course, releases the rod 27, and the carriage (and mold unit thereon) are free to be advanced—by hand—to the extent necessary to "bottom" the horn unit in the mold unit. With such further advancing movement of the carriage, the trip 44 will engage the button 41 of valve 35, and the trip 45 will—at practically the same time—engage the button 42 of valve 37, both of which valves have until now been closed to the air pressure supply, as shown in FIG. 4. With such engagement of the buttons 41 and 42, the respective valves 35 and 37 are opened to the air pressure supply pipe 29. Air pressure thus enters the cylinder 28 to actuate the same in a direction to open the stuffer valve 7, and at the same time enters the rear end of the cylinder 17, as indicated in FIG. 5. Upon opening of stuffer valve 7, meat under pressure feeds to the horn unit 6.

As the meat enters the carriage-supported mold unit through the horn unit and thus tends to exert a retracting movement to said mold unit, the latter is independently moved in the same direction by the action of the cylinder 17. While the pressure imposed on the mold unit by the meat is independent of that imparted to the carriage by the air pressure in the air cylinder 17, such pressures are coordinated so that the meat pressure is sufficient to pack the mold to the required product density. Such coordination of air pressure to meat pressure is effected by suitable adjustment of the retarding cylinder 18.

When the mold unit is filled and the carriage reaches its fully retracted position, the trip 43 again engages the button 40, and the related valve 33 is again opened to the air pressure supply so that the stuffer valve 7 is immediately closed.

Thereafter, the filled mold unit is removed from the carriage and deposited on the platform 21 in the manner hereinbefore described; the carriage then being in position for the reception of another empty mold unit, and another mold filling operation may be started upon the hand valve 30 being opened.

From the foregoing description, it will be readily seen that there has been produced such a food mold loader as substantially fulfills the objects of the invention, as set forth herein.

While this specification sets forth in detail the present and preferred construction of the food mold loader, still in practice such deviations from such detail may be resorted to as do not form a departure from the spirit of the invention, as defined by the appended claims.

Having thus described the invention, the following is claimed as new and useful and upon which Letters Patent is desired:

1. In a food mold loader which includes an upstanding frame, a longitudinally extending table supported by the frame, and a stuffing horn extending lengthwise of and above the table from the rear end thereof; a mold-supporting carriage movable along the table between a retracted position with a supported mold clear of the horn and an advanced position with said mold over the horn, a power unit mounted on the frame, and means connecting said power unit to the carriage to move said carriage in opposite directions.

2. A structure, as in claim 1, with means partly controlled by the arrival of the carriage at its advanced position to place the power unit in operation to move the carriage to said retracted position.

3. A structure, as in claim 1, in which the power unit comprises a double-acting pneumatic cylinder extending lengthwise of the carriage, an air pressure supply pipe, conduits separately connected to the supply pipe and to the front and rear ends of the cylinder, a hand-operated valve to control the flow of air pressure into and out of the conduit leading to the front end of the cylinder, another valve to control the flow of air pressure into and out of the conduit leading to the rear end of the cylinder, the last named valve being arranged to open the related conduit to atmosphere when air pressure is being fed to the cylinder through the first named conduit, and an element on the carriage arranged to move said last named valve to feed air pressure to said related conduit and the rear end of the cylinder upon the carriage reaching its advanced position.

4. A structure, as in claim 3, with a longitudinal safety cylinder mounted in connection with and extending above the table adjacent its rear end, a piston rod slidably projecting from the front end of said safety cylinder in the path of a portion of the carriage, a conduit connected between the air pressure supply pipe and the rear end of said safety cylinder, said carriage portion engaging the projecting rod as the carriage approaches its advanced position, a valve in said conduit movable to open the same to the safety cylinder or to exhaust air pressure therefrom, and an element on the carriage to move said valve to so open the conduit to the cylinder upon engagement of said carriage portion with the rod.

5. A structure, as in claim 1, including means adjustably retarding movement of the mold-supporting carriage in a direction toward said retracted position.

6. In a food mold loader which includes an upstanding frame, a carriage to removably and flatly support a mold, the carriage being mounted for movement lengthwise of and above the frame to adjacent the one end thereof, and a transverse-axis fulcrum roller mounted on the frame at said end thereof in position for tiltable engagement by a filled mold as the latter is manually slid from the carriage to assume a generally upstanding but tilted position; a platform ahead of and below but facing the roller in an initial position substantially at an upward angle to said carriage to receive the bottom of the tilted mold, and means mounting the platform for restrained downward movement from said initial position to a horizontal position.

7. A structure, as in claim 6, in which said mounting means comprises an arm unit supporting and projecting rearwardly from the platform, means pivotally mounting the arm unit at its rear end on the frame, and means acting on the arm unit yieldably resisting downward swinging movement thereof from the initial position of the platform.

8. A structure, as in claim 7, in which said last named means comprises a depending airspring cylinder connected at its upper end to the arm unit intermediate the ends thereof and at its lower end to the frame.

References Cited

UNITED STATES PATENTS

| | | | |
|---|---|---|---|
| 723,072 | 3/1903 | Thom | 141—283 X |
| 2,064,213 | 12/1936 | McJoynt | 141—67 |
| 2,280,022 | 4/1942 | Banigan et al. | 18—30 X |
| 2,341,128 | 2/1944 | Titus et al. | 214—1 |
| 3,164,860 | 1/1965 | Oxel | 18—5 |

LAVERNE D. GEIGER, *Primary Examiner.*

H. S. BELL, *Assistant Examiner.*